United States Patent [19]
Peyron et al.

[11] Patent Number: 5,912,425
[45] Date of Patent: Jun. 15, 1999

[54] PLANT FOR SEPARATING A GAS MIXTURE

[75] Inventors: Jean-Marc Peyron, Creteil; Jean-Marc Tsevery, Lieusaint, both of France

[73] Assignee: L'Air Liquide, Societe Anonyme pour l'Etude et l'Exploitation des Procedes Georges Claude, Paris Cedex, France

[21] Appl. No.: 08/915,684

[22] Filed: Aug. 21, 1997

[30] Foreign Application Priority Data

Aug. 21, 1996 [FR] France ................................... 96 10340

[51] Int. Cl.⁶ .................................................... B01D 53/02
[52] U.S. Cl. ................................................ 96/109; 96/130
[58] Field of Search ...................... 96/4, 7–10, 109–117, 96/121, 130

[56] References Cited

U.S. PATENT DOCUMENTS

| | | | |
|---|---|---|---|
| 3,543,482 | 12/1970 | Foster ........................................ | 96/111 |
| 3,976,451 | 8/1976 | Blackmer et al. ............................ | 96/7 |
| 3,979,190 | 9/1976 | Hedman ....................................... | 96/7 |
| 4,342,573 | 8/1982 | McCombs et al. ....................... | 96/109 |
| 4,373,938 | 2/1983 | McCombs ................................. | 96/114 |
| 4,496,376 | 1/1985 | Hradek ...................................... | 96/112 |
| 4,509,959 | 4/1985 | McCombs .................................. | 55/161 |
| 4,511,377 | 4/1985 | McCombs .............................. | 96/116 X |
| 4,584,001 | 4/1986 | Dechene ..................................... | 96/114 |
| 4,594,080 | 6/1986 | Tremain et al. .......................... | 96/113 |
| 4,631,073 | 12/1986 | Null et al. ............................. | 96/109 X |
| 5,152,966 | 10/1992 | Roe et al. ................................ | 96/8 X |
| 5,249,428 | 10/1993 | Barbe et al. .............................. | 96/7 X |
| 5,429,662 | 7/1995 | Fillet ........................................ | 96/4 X |
| 5,474,595 | 12/1995 | McCombs ............................. | 96/109 X |
| 5,588,984 | 12/1996 | Verini ....................................... | 96/4 X |
| 5,661,987 | 9/1997 | Zarate ................................... | 96/113 X |

FOREIGN PATENT DOCUMENTS

| | | |
|---|---|---|
| 0588705 | 3/1994 | European Pat. Off. . |
| 0629829 | 12/1994 | European Pat. Off. . |
| 2108901 | 5/1972 | France . |
| WO90/08932 | 8/1990 | WIPO . |

*Primary Examiner*—Robert Spitzer
*Attorney, Agent, or Firm*—Young & Thompson

[57] ABSTRACT

A plant for separating a gas mixture includes several units having different functions, including a compression unit, a purification unit and a separating unit. Each unit has an attendant cabin which contains monitoring and control systems and, optionally, an analysis system and an electrical distribution system which are necessary for the operation of the respective unit only. The plant may be an apparatus for separating air by cryogenic distillation.

13 Claims, 1 Drawing Sheet

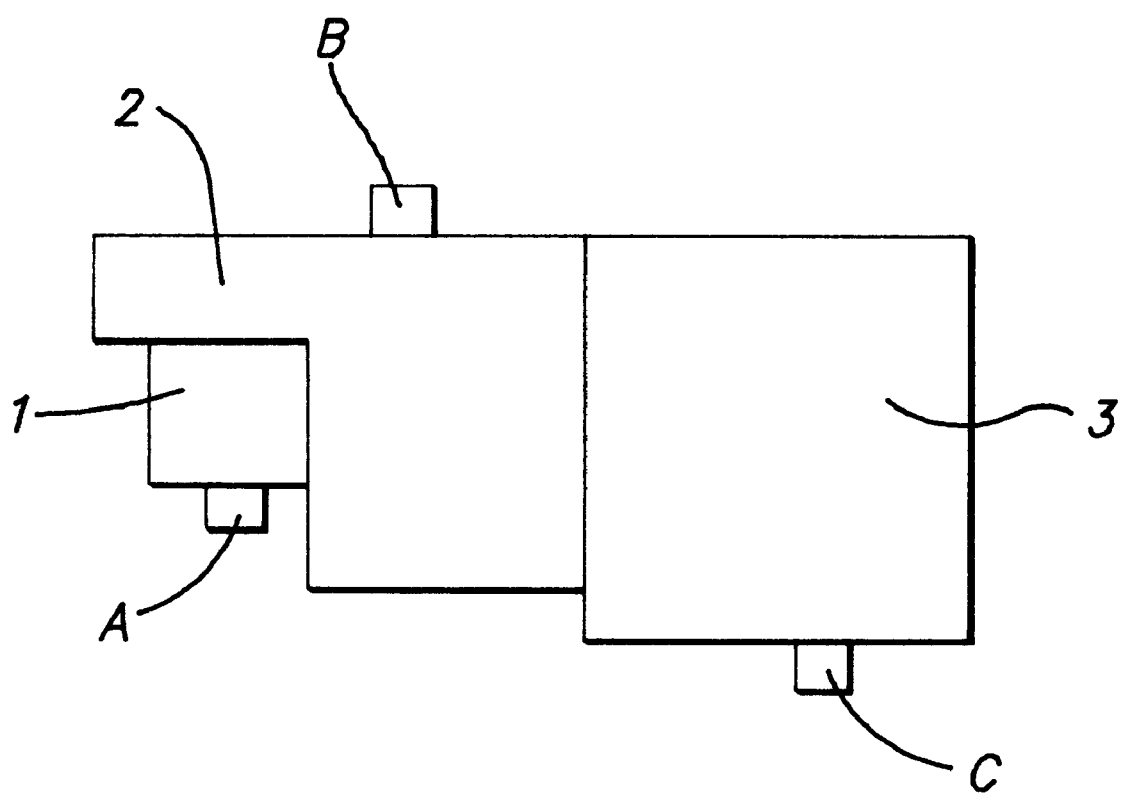

PLANT FOR SEPARATING A GAS MIXTURE

This invention relates to a plant for separating gases.

These plants possess a central monitoring and control room, a central analysis room and a central electrical room in which the monitoring, control, analysis and low-voltage electrical distribution apparatuses for the entire plant are centralized. The effect of this centralization is to slow down the reaction time of the analysers and of the monitoring mechanisms, and requires cabling of great complexity.

The subject of the present invention is a plant having a more rapid reaction time, with a simpler and therefore less expensive construction, which enables the concept of "modularity" to be implemented. In modular plants, the modules may be removed or added at will, depending on the needs of the user, this situation requiring work to be carried out in the central rooms. The present invention makes it possible to modify the plants with a minimum of disturbance to the rest of the plant.

According to the subject of the present invention, a plant for separating a gas mixture is provided which comprises at least one compression unit, one purification unit and one distillation unit, characterized in that at least one unit is provided with a cabin in which the monitoring and control systems and/or the analysis systems and/or the electrical distribution for this unit is (are) found.

Previously, each unit was associated with a respective cabin in which the monitoring and control systems and/or the analysis system and/or the electrical distribution for only this unit was (were) found.

These cabins may be prefabricated and are easily installed alongside the unit with which they are associated.

Each unit may be associated with a single cabin in which all the systems are grouped together, or else each unit may be associated with several cabins, in each of which one of the systems for the unit is found.

The FIGURE shows a diagram of a plant according to the invention.

In the unit 1 are found the compressors of an air separation plant. The cabin A contains the low-voltage output devices for these compressors, the means for analysing the temperatures of the cooling water for the compressors, and the sensors and actuators for the compressors.

Next, the air compressed by the compressors of the unit 1 is purified in the absorbent beds of the purification unit 2, the monitoring, control, analysis and low-voltage parts being found in the cabin B.

After purification, the air passes into the distillation unit 3, which also has its cabin C in which the monitoring, control, analysis and low-voltage systems are grouped together.

The separating plant may be a purification plant or a PSA system or a membrane-type system.

Each cabin A, B, C may be linked to a single supervision room which brings together the information collected in the cabins.

We claim:

1. A plant for separating a gas mixture, comprising a plurality of units including at least one compression unit, a purification unit and a distillation unit, wherein at least one of said purification or distillation units is associated with a cabin which contains a monitoring and control system other than a temperature monitoring and control system, an analysis system, and an electrical distribution system for operation of the one unit associated with the cabin when all of said units are operating.

2. The plant according to claim 1, in which the purification unit and the distillation unit are each associated with their respective cabins in which the control, monitoring and analysis systems for the associated unit and the electrical distribution system for the associated unit are grouped together.

3. The plant according to claim 2, in which each unit of the plant is associated with the respective cabin in which the control, monitoring and analysis systems and the electrical distribution system for this unit alone are grouped together.

4. The plant according to claim 1, having no central monitoring, control or analysis room and no central electrical room.

5. The plant according to claim 1, in which the plant is a purification plant.

6. The plant according to claim 1, in which the distillation unit is an air distillation system.

7. The plant according to claim 1, in which the cabin is linked to a single supervision room bringing together information collected in plural ones of the cabins.

8. The plant according to claim 1, wherein the distillation unit is a cryogenic distillation unit.

9. A plant for separating a gas mixture, comprising a plurality of units including at least one compression unit, a purification unit and a distillation unit, wherein at least one of said purification or distillation units is associated with a cabin which contains a monitoring and control system other than a temperature monitoring and control system.

10. The plant according to claim 9, said cabin further containing an analysis system for operation of the one unit associated with said cabin when all of said units are operating.

11. The plant according to claim 9, said cabin further containing an electrical distribution system for operation of the one unit associated with said cabin when all of said units are operating.

12. A plant for separating a gas mixture, comprising:
   plural functional units for compression, purification, and distillation of a gas;
   each of said units having associated systems for at least one of monitor and control, analysis, and electrical distribution, each of said systems being associated with one of said units and separate from said systems associated with other said units; and
   plural cabins, each being attendant to a respective one of said units, each of said cabins housing the respective systems for the respective one of said units.

13. The plant of claim 12, wherein said associated systems are for at least two of monitor and control, analysis, and electrical distribution.

* * * * *